Oct. 10, 1961　　　　　E. J. MADDEN　　　　　3,003,257
METHOD AND MEANS FOR DISPLAYING POSITIONS AND
MOTIONS OF OBJECTS, IN RELATION TO THE EARTH
Filed Nov. 1, 1956　　　　　　　　　　　　　3 Sheets-Sheet 1
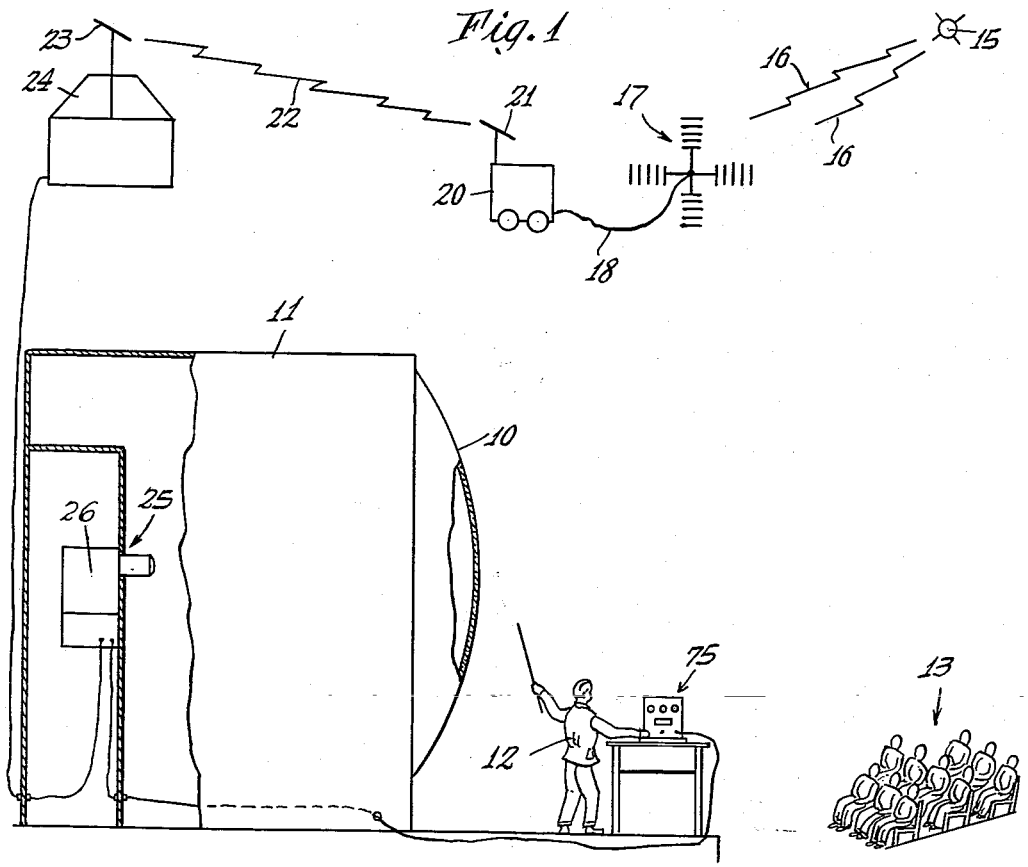
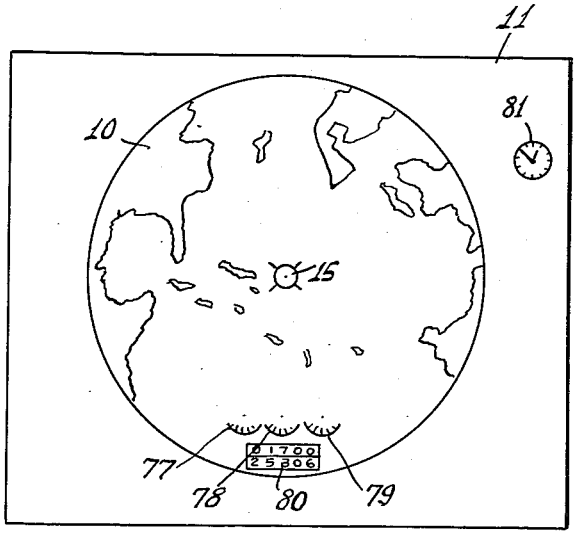
INVENTOR.
Edward J. Madden
BY
H. Gibner Lehmann
AGENT

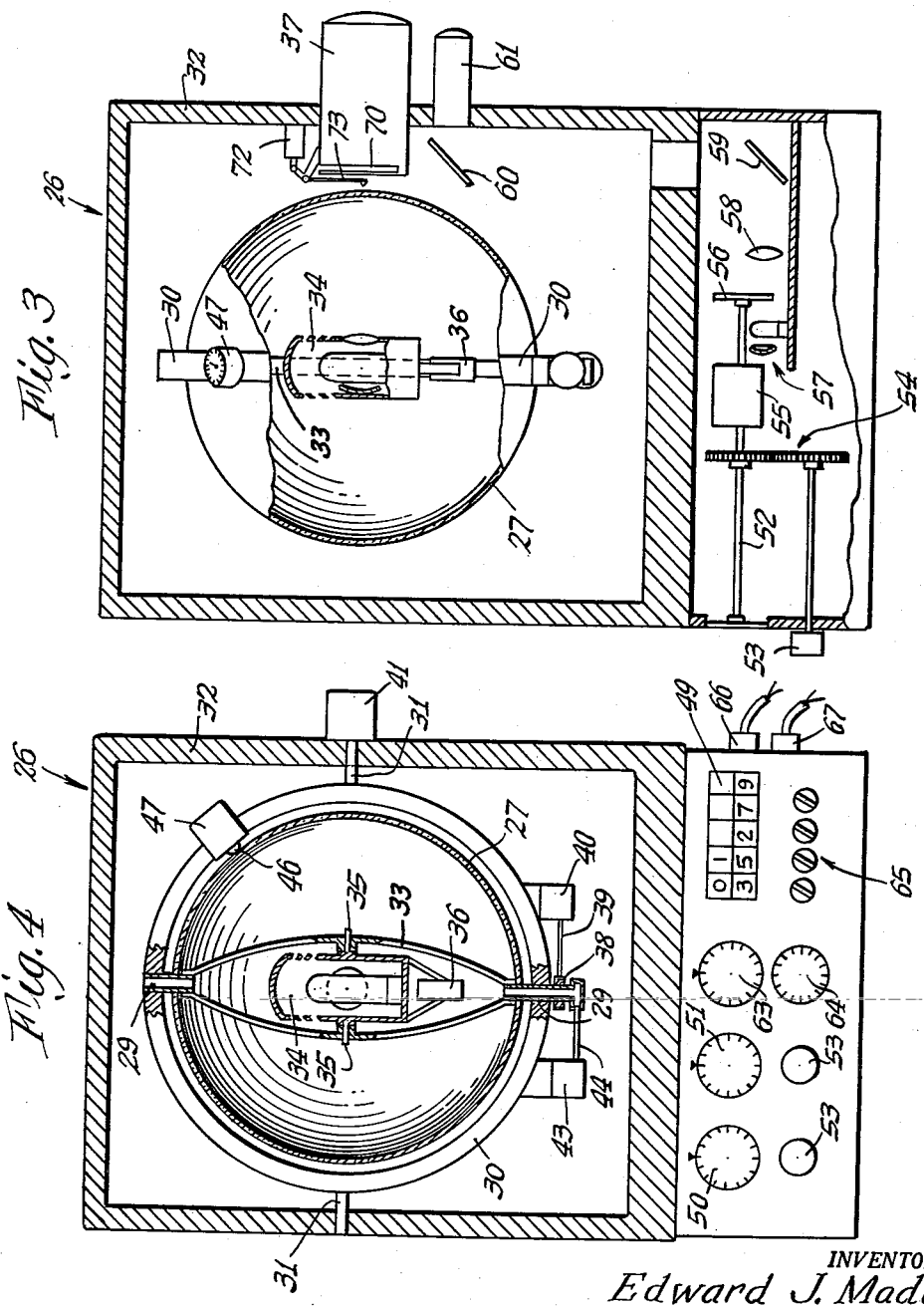

Oct. 10, 1961 E. J. MADDEN 3,003,257
METHOD AND MEANS FOR DISPLAYING POSITIONS AND
MOTIONS OF OBJECTS, IN RELATION TO THE EARTH
Filed Nov. 1, 1956 3 Sheets-Sheet 3
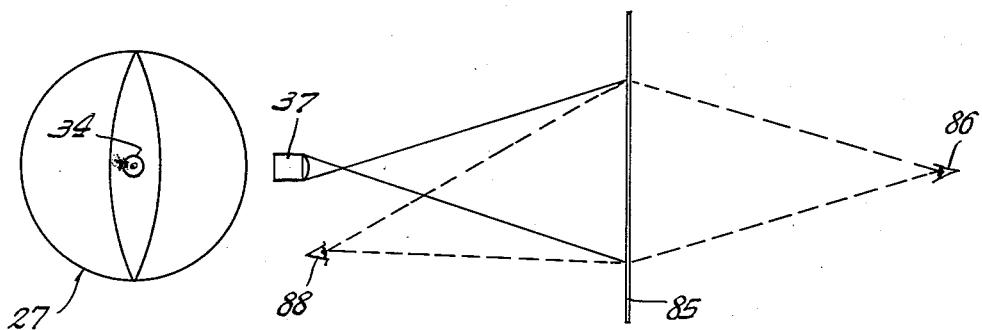
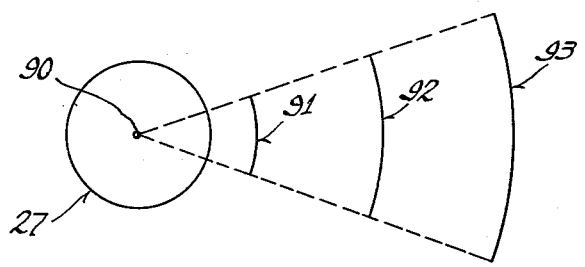
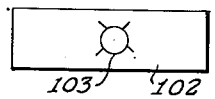
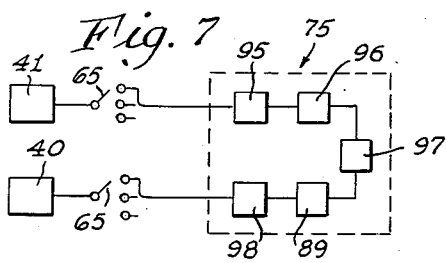
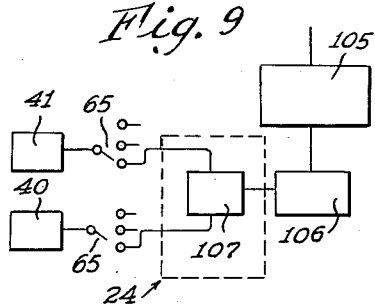
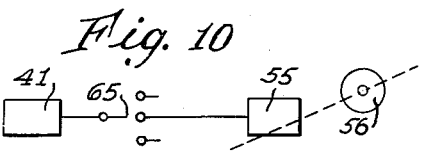
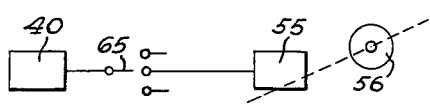
INVENTOR.
Edward J. Madden
BY
H. Gibner Lehmann
AGENT United States Patent Office 3,003,257
Patented Oct. 10, 1961

3,003,257
METHOD AND MEANS FOR DISPLAYING POSITIONS AND MOTIONS OF OBJECTS, IN RELATION TO THE EARTH
Edward J. Madden, P.O. Box 461, Rte. 4, Alexandria, Va.
Filed Nov. 1, 1956, Ser. No. 619,820
15 Claims. (Cl. 35—43)

This invention relates to means for tracing and displaying the positions and motions of objects which are movable with respect to the earth. More particularly, the invention relates to objects movable with regard to the earth's surface, including space objects such as heavenly bodies, man-made satellites, waterborne objects such as boats, submarines, etc.

One object of the invention is to provide a novel and improved method and means by which the flight or path of travel of an object with respect to the earth's surface may be readily visually followed and/or recorded.

A further object of the invention is to provide an improved method and means for optically projecting and displaying any of various desired portions of a global map or spherical map, as for example a map of the earth's surface.

Another object of the invention is to provide a novel and improved method and means for displaying in movement selected adjacent portions or areas of a spherical map of the earth's surface, such areas being shown, for instance, in a continuous and unbroken succession.

A still further object of the invention is to provide an improved means by which there may be traced various desired aerial, or global or submarine tracks, with respect to a selected area of a global or spherical map of the earth.

Yet another object of the invention is to provide an improved method and means for displaying in a continuous succession adjacent portions of a global or spherical map, at predetermined uniform or continuously variable rates of movement.

Another object of the invention is to provide an improved method and means by which surface distance measurements may be continuously obtained from point to point on a global map, involving but a minimum, fairly constant amount of distortion.

Still another object of the invention is to provide a novel and improved means by which there may be simulated the physical relationship between a fixed or moving body at, or above, or below the earth's surface and those portions of the earth's surface disposed beneath, or below, or above the body, expressed in real time or some proportionality thereof. It is intended that the term "earth's surface" as used herein include not only the land or solid portions of the earth, but also the water portions, such as oceans, lakes, seas and the like.

A feature of the invention resides in the means for measuring and recording distances and directions of relative motion, between positions on successive projected areas and a fixed point, optionally together with a continuous display of the longitude and latitude of each successive position under the point.

Another feature of the invention resides in the provision of a novel and improved means and method for displaying the positions and movement of objects, utilizing either flat or curved screens and either reflective or transmissive viewing, that is, viewing of images reflected by the screen or viewing of images by light transmitted through the screen.

Another feature of the invention resides in the provision of an improved means and method for displaying the positions and movements of objects with respect to the earth's surfaces, wherein different magnifications may be easily and quickly effected.

Yet another feature of the invention comprises the method of connecting and adapting the controls and screen display to a central control or ground station of aircraft, missile, satellite, or kindred tracking systems, so that the tracking information is received and processed automatically and continuously positions the map display to exhibit the last known position of the object in its movement.

An important feature of the invention resides in the provision of an improved global tracking means as above characterized, which is simple in its construction, economical to fabricate and produce, and effective and reliable in operation.

Other features and advantages will hereinafter appear.

In the drawings accompanying this specification, similar characters of reference indicate corresponding parts wherever possible in the several views, in which:

FIGURE 1 is a schematic diagram illustrating in its entirety the apparatus of the present invention, by which global tracking is accomplished and displayed.

FIG. 2 is a front elevational view of the display screen or field of the device of FIG. 1.

FIG. 3 is a view partly in side elevation and partly in vertical section, of a portion of the apparatus of FIG. 1 by which there is effected projection of portions of a gobal or spherical map representing the earth's surface, as well as projection of successive portions or areas thereof.

FIG. 4 is a view partly in rear elevation and partly in vertical section, of the device of FIG. 3.

FIG. 5 is a diagrammatic representation of a display apparatus utilizing a flat screen, and illustrating both reflective and transmissive viewing.

FIG. 6 is a diagrammatic representation of a display apparatus utilizing curved screens and illustrating the method of obtaining different magnifications in a simple and quick manner.

FIG. 7 is a block diagram illustrating a remote control system for effecting powered operation of a global or spherical map constituting a portion of the tracking apparatus.

FIG. 8 is a plan view of a slide for use with the projection portion of the apparatus.

FIG. 9 is a block diagram illustrating the system for controlling the powered motive means for the global or spherical map by equipment which is responsive to radar data constituting radio signals which are shown schematically in FIG. 1.

FIG. 10 is a block diagram illustrating a servo-system between the powered spherical map driving motors and slave motors, which latter are used in projection equipment of the apparatus.

Referring first to FIG. 1, the improved apparatus of the present invention comprises essentially a display field or screen 10 supported on one edge in an upright position, in any suitable or desired manner as by mounting the screen on a frame 11 or other supporting means. The screen 10 is preferably of substantial height, being shown as approximately fifteen feet in this dimension, as compared with the height of an instructor or other person 12 standing in front of the screen. The screen 10 is shown as concavo-convex or spherical in shape and is constituted to be translucent, whereby images projected against the screen from the rear therof will be readily visible at the front.

While the screen 10 is indicated as having an approximate height or diameter of fifteen feet, this figure is merely suggestive, since the size of the screen 10 should be sufficiently large to enable a group of people 13 seated in front of the screen, to clearly view various details of a large image projected on the screen. Thus, depending on the number of people which is intended to view the screen, and the proximity of the seats therefor, the screen 10 may be either smaller or larger.

By the present invention means are provided for projecting a sperical or global map on the screen 10 and also an image or representation of an object which may be disposed in the sky above the earth's surface, or on or below the ocean's surface, etc. Such object, for example, might be a man-made satellite, and a representation of such satellite is indicated at 15 in FIG. 2 in conjunction with the viewing screen 10. Such representation may be projected on the screen 10, or may be provided thereon in any other suitable manner.

In FIG. 1 there is represented at 15 the man-made satellite, giving off radio or electromagnetic waves indicated by the zigzag lines 16. Such waves may be picked up by a directional (either fixed or movable) antenna array 17 connected by a suitable cable 18 to a radio receiving ground station 20 which in turn has a transmitting antenna 21 for sending information via radio waves (represented by 22) to the antenna 23 of a central control station 24.

At the control station 24 the flight data from many stations similar to 20, 21 may be combined and computed, to log the path or flight of the object 15, and to predict arrival times and positions, for the information of observer stations, news centers, and spot groups.

In accordance with this invention I provide a novel and improved projection device 25 adapted to utilize such information and to visually produce, for observance by large groups, the conditions to which such information relates, as for example the path of the body 15, the various areas of the global or spherical map of the earth's surface which will be concerned with such path of flight, etc.

Referring to FIGS. 3 and 4, the said projection device 25 may comprise a control box 26 and a transparent globe form 27 on the surface of which there is reproduced a global map in outline, translucent form by which any desired portions of said map may be projected onto the screen 10.

Referring to FIG. 1, the center of curvature of the screen 10 is disposed at the projection device 25 so that the optical radius of the latter generally coincides with the spherical radius of the screen.

The mapped translucent globe 27 is turnably mounted by means of pivots 29 in a flat suspension ring 30 which in turn is mounted by means of pivots 31 in a rectangular housing 32. With such organization, the globe 27 may obviously be made to occupy any desired rotative positions within the casing 32.

For the purpose of projecting the translucent map representation provided on the globe 27 there is disposed within the latter a primary support or yoke 33 secured to the pivots 29, said yoke carrying a secondary support including a projector lamp assembly 34 by means of pivots 35. The lamp assembly 34 has a ballast or counterweight 36 by which it is at all times held in alignment with a projector head 38 mounted at the front of the housing 32. The pivots 29 may constitute the main axis of the globe 27, and the latter may be rotated about such axis through the provision of gearing 38 and a shaft 39 driven by an electric motor 40 mounted on the flat suspension ring 30.

Turning of the globe 27 about a secondary axis is effected by means of an electric motor 41 supported on the housing 32 and geared to one of the pivots 31 so as to turn the flat suspension ring 30 about such pivots.

For the purpose of effecting cooling within the globe 27 I provide a motor and blower 43, mounted on the suspension ring 30 and coupled to an air duct 44 by which air may be forced into the lower pivot 29. Such pivot is made hollow for this purpose, and the bore thereof is turnably connected with the duct 44, thereby to enable the air from the blower 43 to pass into the globe 27 at the lower pivot 29. Also, the upper pivot 29 is preferably made hollow, so that such cooling air may be exhausted from the globe, carrying with it the heat developed by the projector lamp assembly 34.

In accordance with the invention I provide a mileage indicator responsive to movement of the globe 27, in the form of a roller 46 carried by an indicator device 47, the latter being also mounted on the suspension ring 30. In conjunction with the mileage indicator 47 I provide, in the control box 26, a digital recorder or read out device 49 by which there may be indicated the total amount of peripheral movement of the globe 27, in feet, miles, etc.

On the control box 26 I also provide latitude and longitude dials 50 and 51 respectively, said dials being mounted on shafts 52 and being manually settable by knobs 53 coupled to the shafts 52 by gearing 54. The shafts 52 are driven by slave motors 55, such motors responding to the rotation of the motors 40 and 41 by which the globe is rotated about the polar and equatorial axes. The shafts 52 also mount transparent dials 56 having indicia thereon, said dials being subjected to projecting light from light sources 57, such light passing through suitable lenses 58 and striking mirrors 59 and 60, to issue from a projection head 61 for projection on the screen 10. I also provide local and solar time on dials 63 and 64 disposed on the control box 26, such dials being differentially driven by means of gears coupled to the slave drive shaft 52 associated with the longitude dial 50.

Power for the various electrical circuits involved is controlled by switches 65 mounted on the control housing 49, and connector fittings 66 and 67 are provided, for coupling electrical cable to the central control station 24, power supply, etc.

The dials 63 and 64 may be connected to interior transparent dials (not shown) similar to the dials 56, by which the time indications may be projected on the screen 10.

Within the housing 32 and adjacent the projector head 38 I provide a slide or rack 70 adapted to receive slides containing grid indicia, radial distance circles, and other overlays or indicia such as the representation of the satellite image 15 which are to be projected with the map area onto the screen 10. Also, I provide an electrical solenoid 72 and a printing stylus 73 actuated by said solenoid, for spot printing or marking successive points on the globe 27 in erasable ink.

A supplementary control panel and mechanism, indicated at 75 in FIG. 1, may be placed at the disposal of the operator or instructor 12, such mechanism being capable of supplementing the control effected from the central station 24 or being substitutable for such central station control.

In FIG. 2, the projected images of the dial 56 and the transparent dial connected with the dial 63 are indicated by the numerals 77, 78 and 79, and the projected image of the indicator 49 is indicated by the numeral 80. Longitude and latitude are given, therefore, by the projections 77 and 78, and the solar time is given by the projection 79. A clock 81 may be mounted on the frame 11, to indicate the local time.

Operation of the tracking apparatus shown in FIGS. 1–4 is as follows. Referring to FIGS. 3 and 4, it will be understood that the projection unit 34 in conjunction with the projector head 38 will cause a given area or section of the global map to be displayed on the screen 10. By virtue of the compound mounting for the globe 27, the latter may be universally rotated about its main axis and any other axis. Rotation about either axis without respect to the other is possible, or rotation simultaneously about both axes, depending on the energization of the motors 40, 41. Thus any desired area or any successive adjacent areas may be thrown on the screen 10, and the projection may be still or may be continually moving. Also, the rate of movement may be varied by changing the speed of the motors. The image 15 of the satellite will remain fixed at the center of the screen 10, and thus there may be simulated the flight of the satellite, or more properly of a projection of such satellite vertically on the earth. Also, the solar and local times will be indicated, as well as the speed of movement of the satellite with respect to the earth and the actual distance covered by the satellite at any time, from a given point of origin.

The coordination of information obtained from a number of radio stations equipped with directional antenna arrays may be made to automatically cause a movement of the globe 27, as determined by the flight of the satellite, and accordingly an instantaneous and accurate tracking of such object in the skies will be had.

While the image 15 has been described as a satellite travelling in the skies, it will be understood that such image may represent a ship or craft travelling on the surface of the ocean, or a submarine object travelling below the water's surface. In any case, the object is located and tracked by suitable electronic equipment, and the information obtained thereby is utilized to cause corresponding movement of the globe 27 so as to accurately reproduce the position and path of movement of the object, for projection on the screen.

While the screen 10 has been shown as curved or spherical, this is not essential to the invention, since a flat screen 85 may be utilized as illustrated in FIG. 5. The screen 85 is located at the proper distance from the projection head 38 to secure the desired magnification, and focusing of the head accomplished in the usual manner. Viewing of the screen 85 by translucent transmission is indicated by the representation of a viewing eye 86, and I have found that satisfactory projection and display may be obtained with projection angles of as great as fifteen degrees, utilizing for the projector head 38 a standard slide projector unit, with a standard projector lamp unit 34. With such transmissive viewing, the map on the globe 27 must not only be inverted (top and bottom portions reversed) but it must also be reversed laterally, left for right, in order to appear properly on the screen 85, and the same is of course true for the curved screen 10 illustrated in FIGS. 1 and 2.

In FIG. 5 reflective viewing is indicated by the representation of an eye 88 disposed at the left side of the screen 85, and for such viewing the map on the globe 27 need be only inverted, this also being true if the curved screen 10 is viewed reflectively. The reflective viewing arrangement has the advantage that space may be saved, and this could be of importance where large magnifications are involved. It may be here noted that the curved screen 10 is best used with a point source of light.

In the above display systems, change of magnification may be readily effected by changing the optical radius of the lens system, and this does not necessitate a change in the position of the globe 27, or the screens 10, 85.

With the above organization, utilizing a flat screen, it is expected that wide commercial application of the invention will be realized with the least cost and with minimum space requirements.

While a maximum angle of fifteen degrees has been indicated as suitable, this angle may be increased to about thirty degrees by the use of suitable corrector plates.

An apparatus by which wide angle projection may be readily obtained in a simple manner is illustrated in FIG. 6, and such apparatus may be utilized for projection angles greater than thirty degrees. In this figure, 90 represents a point source of light, located at the center of the display globe 27; 91 represents a relatively small curved screen, 92 represents a larger curved screen, and 93 represents a still larger curved screen. No projection head or lens system is utilized, but instead the image on the globe 27 is thrown directly on one or the other of the screens 91, 92 or 93. The larger screens are, of course, located further from the globe 27, and in each instance the radius of curvature of the screen is equal to the distance of the screen from the point source of light 90. It may be noted that the magnification factor is directly proportional to the ratio of the radii of the screen and the globe. Where the screen radius is equal to that of the globe, obviously there is coincidence and no magnification, since the ratio is 1:1. If the screen is intended to show an image equivalent to that of a forty-foot (diameter) globe, then the screen radius of curvature would be twenty feet, and it would be located twenty feet from the light source 90.

The apparatus of this invention is relatively simple and inexpensive to produce. It provides a means for displaying important information to a large group of people, and such indications may be reproduced and/or recorded, as desired, by suitable equipment.

In accordance with the method of the invention, there are provided the steps of passing a translucent map image across a projecting light beam in accordance with longitude and latitude data supplied by the directional antenna arrays, thereby to enable a projection of a global or spherical map to be had on a large screen in conjunction with a designation of a moving body or object. Correlated with such movement are indications as to latitude, longitude, solar time, speed and distance travelled.

Variations and modifications may be made within the scope of the claims and portions of the improvements may be used without others.

FIGURE 7 shows a block diagram illustrating the remote control of the motors 40, 41. The motor 41 may be connected through a rheostat or equivalent control 95 and an "on-off" switch 96 to a source of energy 97, thereby to enable starting and stopping of the motor 41 to be effected as well as a variable speed thereof. Similarly the motor 40 is connected through a control rheostat 98 and switch 89 to the source of power 97, for the same purpose.

FIG. 8 illustrates a slide 102 having a line drawing 103, the said slide being insertable in the rack 70 shown in FIG. 3, to provide for projection of the drawing 103 whereby the projected image will appear as the image 15 shown in FIG. 1.

FIG. 9 is a block diagram illustrating equipment associated with the control station 24. At the stations 20 (only one of which is shown in FIG. 1) the received radio waves may be fed to analog resolvers 105 or their digital equivalent, and the outputs from these units may be fed to transmitters 106 which in turn supply converters 107 (at the central station 24), the latter effecting energization of the motors 40, 41 to cause these to turn proportionally from a well known former position, so as to align the optical axis of projection with the sub-vehicle point on the earth map. It is understood that initially signals are transmitted through this equipment, corresponding to a known radar attitude with respect to the equator and to the polar axis, from which all subsequent angular displacements are measured.

FIG. 10 illustrates in block diagram form the connections between the driving motors 40, 41 for the globe 27 and the slave motors 55 which operate the indicators 50, 51. Any suitable servo-mechanism incorporating the slave motors 55 may be utilized, as is well known and understood in the art.

In FIGS. 7, 9 and 10 the switches 65 are selector switches by which the motors 40, 41 may be selectively energized from the signal sources shown respectively in these figures. A patent showing a central station having a converter which is similar to the station 24 and to the converter 107 shown in FIG. 9, is that issued to Steelman December 9, 1958, No. 2,864,081. This patent has transmitting observation stations similar to the transmitter 106 shown in FIG. 9, such stations also having converter and coding units in addition to the transmitter units, the converter and coding units being likened to the analog resolvers 105 shown in FIG. 9.

I claim:

1. Apparatus for tracing the path of an object moving with respect to the earth's surface, comprising a translucent, convex map; means mounting said map for movement about two axes at right angles to each other; a relatively large screen disposed at a distance in front of said map; projection means, including a light source, providing a concentrated beam of light directed at inner surfaces of said map from the concave side thereof, thereby to project any desired portions of said map on said screen; powered means for moving said map about said axes; electrical control means for actuating said powered means from a remote point, thereby to shift the translucent map in a desired direction for projecting successive adjacent portions of the map on the screen; and indicia means associated with said projection means and disposed closely adjacent the exterior convex surface of the map, said map being interposed between the light source and indicia means for causing a stationary image, constituting a representation of said object, to be projected on the screen to simulate superposition of said image on said map, said image remaining stationary regardless of movement of the said map.

2. The invention as defined in claim 1 in which there is a radio receiver, in which there is an antenna connected with the receiver and means connected to said control means for actuating the latter in response to signals received by said antenna, thereby to cause movement of the said map.

3. The invention as defined in claim 1 in which there is means including slave motors responsive to movement of said powered means, for indicating solar time with respect to the projection of the said stationary image of said object on the screen.

4. The invention as defined in claim 1 in which there are longitude and latitude indicators, and means including slave motors connected with said powered means, for actuating said indicators in response to operation of the said powered means, thereby to indicate the latitude and longitude at any time of a stationary reference point referred to said map.

5. The invention as defined in claim 1 in which the convex map comprises a globe, and in which the means mounting the map includes a suspension ring completely encircling the globe, pivots connecting the globe to the ring at a certain axis of the globe, and pivots disposed 90 degrees from said first-mentioned pivots and connecting the suspension ring to a support.

6. The invention as defined in claim 5 in which there is means for passing cooling air through the globe, comprising a blower carried by the suspension ring, the said pivots connected to the globe being hollow and one of said pivots receiving air from said blower.

7. The invention as defined in claim 1 in which there is a fixedly-mounted optionally operable marking device disposed adjacent the map, for providing indications thereon for projection by said light beam, and power-operated means for actuating said marking device.

8. The invention as defined in claim 1 in which there is means including a fixedly mounted friction driven distance indicator carried by the map mounting means and engaging the surface of said map, for indicating the extent of movement of the map.

9. Apparatus for tracing the path of an object moving with respect to the earth's surface, comprising a translucent, convex map; means mounting said map for movement about two axes at right angles to each other; a relatively large screen disposed at a distance in front of said map; projection means, including a light source, providing a concentrated beam of light directed at said map from the concave side thereof, thereby to project portions of said map on said screen; powered means for moving said map about said point; electrical control means for actuating said powered means from a remote point, thereby to shift the translucent map in a desired direction for projecting successive adjacent portions of the map on the screen; means associated with said projection means, for causing a stationary image, constituting a representation of said object, to be projected on the screen to simulate superposition of said image on said map; means including an indicator engaging the surface of said map, for indicating the extent of movement of the map; and a totalizer means connected with said indicator means, for effecting a summation of the distances indicated by the latter.

10. Apparatus for tracing the path of an object moving with respect to the earth's surface, comprising a translucent, convex map; means mounting said map for movement about two axes at right angles to each other; a relatively large screen disposed at a distance in front of said map; projection means, including a light source, providing a concentrated beam of light directed at said map from the concave side thereof, thereby to project portions of said map on said screen; powered means for moving said map about said point; electrical control means for actuating said powered means from a remote point, thereby to shift the translucent map in a desired direction for projecting successive adjacent portions of the map on the screen; means associated with said projection means, for causing a stationary image, constituting a representation of said object, to be projected on the screen to simulate superposition of said image on said map; longitude and latitude indicators; means for actuating said indicators in response to operation of said powered means, thereby to indicate the latitude and longitude at any time of a stationary reference point referred to said map; and means for projecting on said screen the indications of said latitude and longitude indicators.

11. A display apparatus comprising a translucent, convex map; biaxial means disposed at the front of the map, mounting said map for universal movement about two axes at right angles to each other; a relatively large screen disposed at a distance horizontally in front of said map; a weighted, gravity-controlled secondary support at the rear of the map; projection means carried by said secondary support, including a light source providing a concentrated beam of light directed horizontally at said map from the concave side thereof, thereby to project portions of the map on said screen; and support means pivotally carrying said secondary support and rotatably connected with the map and with at least one point on the map-mounting means at one of the said two axes, to move with the map as the latter is turned about the other of said axes.

12. The invention is defined in claim 11 in which the convex map comprises a globe, and in which the biaxial means mounting the map includes a suspension ring completely encircling the globe, pivots connecting the globe to the ring at the said one axis, and pivots disposed 90 degrees from said first-mentioned pivots and located in the other one of said axes, connecting the suspension ring to a support.

13. The invention as defined in claim 12, in which there is means for passing cooling air through the globe, comprising a blower carried by the suspension ring, the said pivots connected to the globe being hollow and one of said pivots receiving air from said blower.

14. The invention as defined in claim 12, in which the said support means comprises a primary support disposed in said globe and turnable with respect thereto, and in which the secondary support is turnably mounted on said primary support at a central point thereon.

15. The invention as defined in claim 14 in which the weight carried by said secondary support for utilizing the force of gravity to hold the support and the light source in a fixed predetermined operative position with respect to the earth is concentrated generally at one location on the support, said light source being disposed above said weight.

References Cited in the file of this patent

UNITED STATES PATENTS

| | | |
|---|---|---|
| 1,263,355 | Artigue | Apr. 16, 1918 |
| 1,669,407 | Artigue | May 15, 1928 |
| 2,027,530 | Hammond | Jan. 14, 1936 |
| 2,202,438 | Tidler | May 28, 1940 |
| 2,336,436 | Beindorf | Dec. 7, 1943 |
| 2,431,847 | Van Dusen | Dec. 2, 1947 |
| 2,483,216 | Marshall | Sept. 27, 1949 |
| 2,885,791 | Gunning | May 12, 1959 |